Jan. 11, 1966     O. JENSEN     3,229,187
RECTIFIER SECTION BALANCING STRUCTURE
Filed May 15, 1963
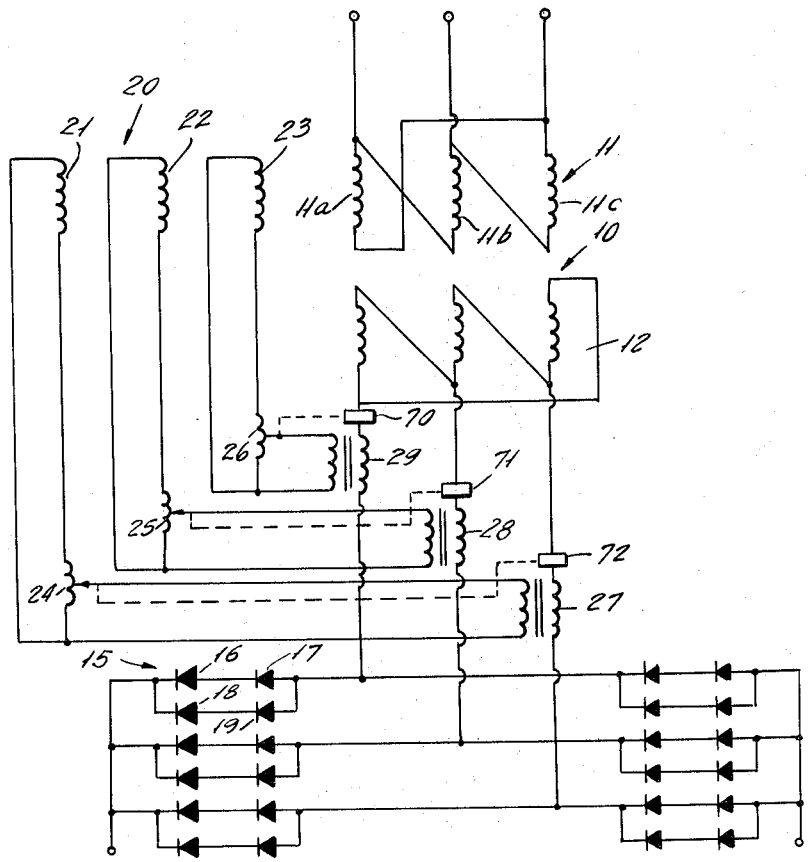
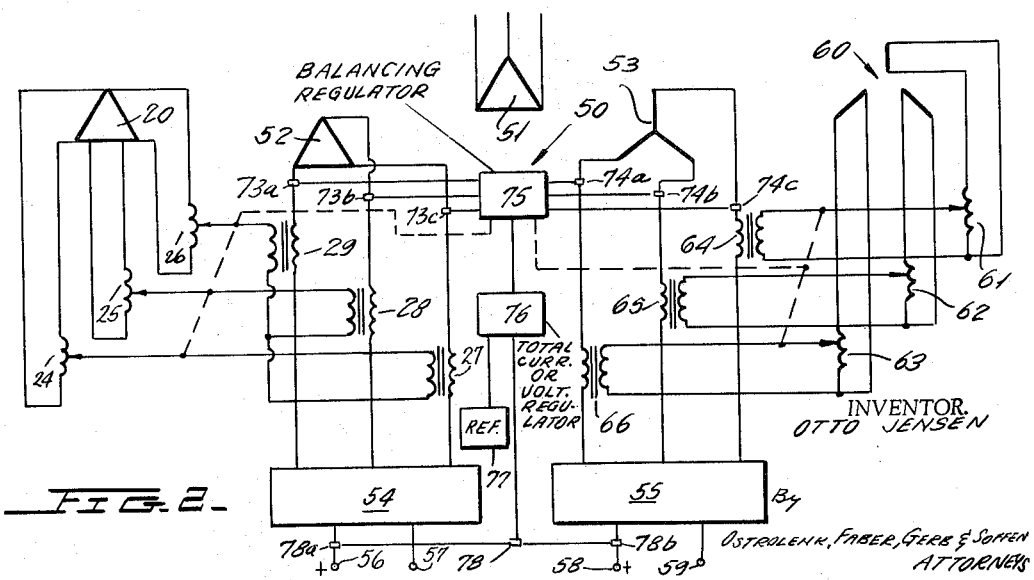
INVENTOR.
OTTO JENSEN
BY OSTROLENK, FABER, GERB & SOFFEN
ATTORNEYS

United States Patent Office 3,229,187
Patented Jan. 11, 1966

3,229,187
RECTIFIER SECTION BALANCING STRUCTURE
Otto Jensen, Malvern, Pa., assignor to I-T-E Circuit Breaker Company, Philadelphia, Pa., a corporation of Pennsylvania
Filed May 15, 1963, Ser. No. 280,633
4 Claims. (Cl. 321—26)

This invention relates to a novel balancing structure for rectifiers, and more specifically relates to a novel current balancing structure for balancing the currents of two parallel connected rectifier sections.

Rectifier current balancing equipment is well-known in the art, and takes many forms. Typically, however, this equipment is utilized for the balancing of currents through parallel connected elements. By way of example, in United States Patent No. 2,994,028 to I. K. Dortort, entitled Current Balancing Reactors for Rectifier Elements assigned to the assignee of the present invention, the conductors of parallel connected rectifier elements are magnetically coupled by coupling reactor means, whereby unbalances in current through the individual rectifier elements is automatically compensated by the coupling reactor.

Another manner in which balancing between individual rectifier elements has been achieved is of the type shown in the United States patent to Michaelis No. 3,098,963 wherein each individual rectifier element is provided with its own respective auxiliary voltage source which adjusts the forward voltage on its respective rectifier element until the current through all the parallel connected elements is substantially the same.

The principle of the present invention is to provide auxiliary voltage source means for each phase of a rectifier, or each section of a rectifier, which is adjustable until phase currents or section currents are equal. It is to be specifically noted that in the case of the present invention, a single auxiliary voltage source means will be provided for a plurality of parallel connected rectifier elements, as contrasted to the use of an auxiliary voltage source for each individual rectifier element.

Accordingly, a primary object of this invention is to provide a novel balancing circuit for rectifier elements.

Another object of this invention is to provide a novel auxiliary voltage source for adjusting the forward voltage across a plurality of parallel connected rectifier elements.

A still further object of this invention is to provide a novel balancing circuit for balancing the current between two rectifier sections.

These and other objects of this invention will become apparent from the following description when taken in connection with the drawings, in which:

FIGURE 1 illustrates a three-phase bridge connected rectifier system having adjustable auxiliary voltage source means for each of the phases thereof which are independently adjustable.

FIGURE 2 illustrates the manner in which the balancing circuit of FIGURE 1 is applied to the two sections of a rectifier.

Referring first to FIGURE 1, I have illustrated therein a rectifier system which includes a power transformer 10 consisting of a delta connected primary winding 11 and a delta connected secondary winding 12. A three-phase bridge connected rectifier system is then connected to secondary winding 12 in the well-known manner where the rectifier system is comprised of bridge arms which each consists of two parallel connected rectifiers and two series connected rectifiers.

In an actual installation, it will be understood that each of the arms may have any number of rectifier elements connected in parallel to achieve a predetermined current rating and, in a similar manner, will have any number of series connected rectifiers to achieve a required voltage rating.

For purposes of illustration, however, each arm of the rectifier may be constructed as illustrated for arm 15 as being comprised of series connected rectifier elements 16–17 and series connected rectifier elements 18–19 where the series chains are connected in parallel.

In accordance with the present invention, an auxiliary set of primary windings 20 are provided where, for example, winding 21 corresponds in phase to winding 11a; winding 22 corresponds in phase to winding 11b; and winding 23 corresponds in phase to winding 11c.

Each of windings 21, 22 and 23 is then connected to the primary circuit of autotransformers 24, 25 and 26 respectively, while the secondary circuits of transformers 24, 25 and 26 are connected to the primary windings of transformers 27, 28 and 29 respectively. The secondary windings of transformers 27, 28 and 29 are in series with the three respective phases of secondary winding 12.

It is to be understood that the portion of the system including windings 20 and 24 through 29 is so designed that a voltage of the order of 5% of the output voltage of secondary winding 12 is, at most, available at windings 27 through 29.

In operation, and in order to adjust the current in the three phases of secondary winding 12, it will be apparent that autotransformers 24, 25 and 26 may be adjusted to add sufficient voltage to the phase voltages of transformer 12 as windings 27, 28 and 29 to cause a balanced current flow through the three phases.

While the arrangement of the invention in FIGURE 1 has been illustrated as adding voltages in a controlled manner to the secondary circuit of transformer 10, it will be apparent that the voltage control circuit could have been applied to the primary circuit of the transformer 11. Moreover, it will be apparent that means other than the autotransformers 24, 25 and 26 could be used as an auxiliary voltage source. Other auxiliary voltage sources would include saturable core reactor systems, self activating magnetic amplifiers, and the like.

It will also be noted that other auxiliary voltage source means, adapted to be able to reverse the polarity of the voltage applied to windings 27, 28 and 29, could be utilized so that the small additional voltages added in the secondary of transformer 12 can be of opposing or additive polarity.

FIGURE 2 illustrates the manner in which the phase current balancing system of FIGURE 1 can be utilized for balancing the currents of two rectifier sections. More specifically, in FIGURE 2, I have illustrated a rectifier power transformer 50 comprised of a primary winding 51 and two secondary windings; delta connected secondary winding 52 and Y connected secondary winding 53. Each of windings 52 and 53 drives its own respective rectifier section, schematically illustrated as blocks 54 and 55 respectively, which have output terminals 56–57 and 58–59 respectively. The output terminals 56 and 58 can be connected together to form a common positive output bus, while the terminals 57 and 59 form a common negative output bus.

In accordance with the invention, the phase currents of transformer secondary 52 may be balanced by the transformer 20 of FIGURE 1 along with its associated autotransformers 24 through 26 which are connected to series transformer windings 27 through 29 for each of the phases of transformer 52 (which is equivalent to secondary winding 12 in FIGURE 1).

A similar balancing arrangement is then provided for transformer secondary 53 which is comprised of auxiliary transformer windings 60 connected to an open Y connection to autotransformers 61, 62 and 63. Autotransformers 61, 62 and 63 are then connected in turn to series transformers 64, 65 and 66 whereby appropriate adjustment of the secondary voltage of transformers 61 through 63 will add a desired additive voltage to the various phases of secondary winding 53.

It will now be clear that the output current at terminals 56 and 57 may be made equal to the output current of terminals 58 and 59 by appropriate adjustment of all three transformers 61, 62 and 63 with respect to transformers 24, 25 and 26. That is to say, the complete level of the secondary phase current can be controlled by the common adjustment of the autotransformers of each rectifier section. Thus, the rectifier section currents may be balanced. In a similar manner, the currents between each of the phases may be adjusted by adjustment of transformers 61, 62 and 63 with respect to one another, and by adjustment of transformers 24, 25 and 26 with respect to one another.

The present invention also permits automatic current balancing by connecting constant current regulating means in each of the phases (or sections) and driving the adjustable transformers through an appropriate servo system using the current regulators as the input means.

By way of example, in FIGURE 1, three current regulators 70, 71 and 72 are connected in the three respective phases of secondary winding 12. Regulators 70, 71 and 72 are schematically illustrated in dotted lines to be connected to variable transformers 24, 25 and 26 respectively whereby, when the phase current of any phase varies from some predetermined amount, the respective adjustable transformer is automatically adjusted to bring the phase current back to its predetermined value.

Automatic regulation may be achieved in FIGURE 2 by providing current control 73a, 73b, 73c and 74a, 74b, 74c in each of the phases which are connected to a suitable balancing regulator 75. A totalizing current measuring structure 78 driven from respective current measuring means 78a and 78b is then connected to a regulator voltage or current control means 76 having a reference 77 associated therewith to insure, automatically, that each phase or section carries its respective share of the load.

Although this invention has been described with respect to preferred embodiments thereof, many variations and modifications will now be obvious to those skilled in the art, and it is preferred, therefore, that the scope of the invention be limited not by the specific disclosure herein but only by the appended claims.

The embodiments of the invention in which an exclusive privilege or property is claimed are defined as follows:

1. A rectifier current balancing structure for a multiphase rectifier comprising
    (a) a multiphase rectifier transformer having a multiphase primary and a multiphase secondary winding;
    (b) a plurality of parallel connected rectifier elements connected in series with each of said secondary windings;
    (c) a second transformer having secondary windings, each connected in series with one of the multiphase windings of said multiphase rectifier transformer;
    (d) and an adjustable voltage source connected to the primary windings of said second transformer to to impress an adjustable voltage in each of said phases to balance current flow between said phases.

2. A rectifier current balancing structure for a multiphase rectifier comprising
    (a) a multiphase rectifier transformer having a multiphase primary and a multiphase secondary winding;
    (b) a plurality of parallel connected rectifier elements connected in series with each of said secondary windings:
    (c) a second transformer having secondary windings, each connected in seriees with one of the multiphase windings of said multiphase rectifier transformer;
    (d) and an adjustable voltage source connected to the primary windings of said second transformer to impress an adjustable voltage in each of said phases to balance current flow between said phases;
    (e) each of said adjustable voltage sources comprising an auxiliary multiphase transformer winding and a series connected adjustable autotransformer in series with each of the windings of said multiphase transformer winding; the secondary winding of each of said autotransformers being connected in series with a respective primary winding of said second transformer.

3. A rectifier current balancing structure for a multiphase rectifier comprising
    (a) a multiphase rectifier transformer having a multiphase primary and a multiphase secondary winding;
    (b) a plurality of parallel connected rectifier elements connected in series with each of said secondary windings;
    (c) a second transformer having a secondary winding connected in series with each winding of said multiphase secondary windings;
    (d) and an adjustable voltage source connected to the primary windings of said second transformer to impress an adjustable voltage in each of said phases to balance current flow between said phases.

4. A rectifier current balancing structure for a multiphase rectifier comprising
    (a) a multiphase rectifier transformer having a multiphase primary and a multiphase secondary winding;
    (b) a plurality of parallel connected rectifier elements connected in series with each of said secondary windings;
    (c) a second transformer having secondary windings, each connected in series with one of the multiphase windings of said multiphase rectifier transformer;
    (d) and an adjustable voltage source connected to the primary windings of said second transformer to impress an adjustable voltage in each of said phases to balance current flow between said phases;
    (e) said multiphase secondary winding having a first and second three-phase portion;
    (f) said plurality of rectifier elements forming a first and second section connected to said first and second three-phase portion of said multiphase secondary winding; adjustment of said adjustable voltage sources balancing the output current of said first and second rectifier sections respectively.

References Cited by the Examiner
UNITED STATES PATENTS 2,243,572  5/1941  Mayer et al. _____321—27
3,098,963  7/1963  Michaelis _____ 321—27

MAX L. LEVY, *Primary Examiner.*